United States Patent [19]

Smeggil et al.

[11] Patent Number: 5,547,122

[45] Date of Patent: Aug. 20, 1996

[54] JOINTS IN BONDING OF ELECTRICAL WIRES

[75] Inventors: John G. Smeggil, Simsbury; Elizabeth A. Rasley, both of Glastonbury, Conn.; Bill R. McCoy, Statesville, N.C.

[73] Assignee: United Technologies Motor Systems, Inc., Columbus, Miss.

[21] Appl. No.: 399,820

[22] Filed: Mar. 7, 1995

[51] Int. Cl.$^6$ ............................ B23K 11/34; H02K 13/04; H01R 4/02

[52] U.S. Cl. .................... 228/173.3; 228/179.1; 228/205; 219/56.22; 219/91.21

[58] Field of Search ................. 228/173.3, 179.1, 228/205, 173.5; 219/56.1, 56.22, 91.21

[56] References Cited

U.S. PATENT DOCUMENTS

| | | | |
|---|---|---|---|
| 4,203,020 | 5/1980 | Armbruster et al. | 219/56.22 X |
| 4,516,103 | 5/1985 | Arnold | 228/173.5 |
| 4,824,744 | 4/1989 | Kuo et al. | 228/173.3 X |
| 4,890,377 | 1/1990 | Ebner | 29/597 |
| 5,057,661 | 10/1991 | Banner | 219/56.22 |
| 5,216,309 | 6/1993 | Balke et al. | 310/233 |
| 5,245,240 | 9/1993 | Takasaki | 310/237 |
| 5,447,268 | 9/1995 | Fukui et al. | 228/179.1 |

FOREIGN PATENT DOCUMENTS 563234  8/1944  United Kingdom ................ 228/173.3

*Primary Examiner*—Kenneth J. Ramsey
*Attorney, Agent, or Firm*—Chilton, Alix & Van Kirk

[57] ABSTRACT

A method is disclosed for improving the metallurgical bond between the end of an armature wire of an electric motor and the connector riser or tine on the motor armature. The armature wire has a titanium oxide-containing insulation coating. The titanium oxide content improves the resistance of the wire to erosive forces which occur during the winding operation but it also tends to interfere with the metallurgical bond between the wire and the riser or tine. The disclosed method involves the roughening of the surface of the riser or tine at least to a depth equal to the thickness of the insulation. Grit or vapor blasting with silica glass beads as well as other roughening techniques are disclosed.

8 Claims, 5 Drawing Sheets

200X OPTICAL MICROGRAPH

4000X ELECTRON MICROGRAPH

TITANIUM X-RAY

100x
OPTICAL MICROGRAPH

BOND LINE

BOND LINE
500X
OPTICAL MICROGRAPH

BOND LINE

4000X
ELECTRON MICROGRAPH

TITANIUM X-RAY

JOINTS IN BONDING OF ELECTRICAL WIRES

BACKGROUND OF THE INVENTION

The present invention relates to the bonding of electrical wires to a terminal and particularly to the bonding of insulated copper armature winding wires to commutators.

In the modern manufacture of motor armatures, the rapid winding of the insulated magnet wire onto the motor armature is an economic necessity. To achieve high winding speeds, the magnetic wire insulation must exhibit a high degree of erosion resistance for the insulation to survive the mechanical stresses involved.

Modern day high performance magnetic wire insulation achieves the required erosion resistance by the addition of air and moisture sensitive organo-titanium compounds mixed in with the insulation resin chemistry. Small amounts of such titanium compounds (i.e., a few hundred ppm) have been used by formulators for a long time to catalyze various organic reactions occurring during the formulation of their resins. Once these compounding chemistries are complete, and on exposure to air and moisture, the organo-titanium additions produce very fine dispersions of hydrated titanium oxides. It was then recognized that these dispersions improved the resistance of the magnetic wire to the erosive forces which occur during the winding operation. Over the years, the titanium concentrations in the resin have been increasing. These titanium levels are generally on the level of 0.3 to 0.8 weight percent titanium calculated as the metal.

The magnetic wire of the armature is attached to the commutator of the armature by means of connectors which are referred to as risers or tines. These tines are hooked-shaped tabs connected to each commutator segment through which the end of the each magnetic wire passes. The tine is crimped over the wire and an electrical current is then passed through the tine to spot weld or fuse the wire to the tine. During the passage of electrical current, the organic resin component of the insulation is burned, converting the organic resin component to gaseous oxides. However, the comparatively refractory inorganic component (i.e., titanium oxides) remains. The titanium oxides that are now present at the interface between the tine and the magnetic wire prevent the formation of a metallurgical bond between the two components. A relatively high resistance barrier is formed across the joint. At most, there are only isolated points of direct contact between the wire and the commutator tine. It is basically only a mechanical bond with the wire and tine merely in physical contact with each other through an intervening insulating oxide layer.

In the short term, productivity is diminished because of these poor bonds since a small fraction of the motors produced will have unacceptably high electrical resistances. In the long term, some motors which are initially acceptable will fail because electrical resistances can increase during service. This happens because the titanium oxides may not be in the stable high temperature forms, i.e., rutile, anatase or brookite. Instead, they may be in the hydrated, lower temperature forms. These hydrated forms will release water when heated during operation and can also pick up water from the ambient environment when cold. These transformations will result in volume changes in the oxide producing fatigue effects in the bond. Also, since the hydrated oxide layer does not form a hermetic seal at the interface, atmospheric moisture and other corrodents can have easy access to the bond line during the service life. It can be seen that the inclusion of the organotitanium compounds in the insulation resin chemistry creates both a benefit and a problem.

SUMMARY OF THE INVENTION

The present invention is directed to a method of improving the bond between a wire having a titanium oxide-containing insulation with a connector. More specifically, the invention relates to the surface preparation of the connectors, referred to as risers or tines, on the commutator of a motor armature so that a good electrical bond is formed between the insulated armature wires and the tines. This surface preparation involves the roughening of the tine surface to a degree or depth proportional to the thickness of the insulation coating on the wire.

DESCRIPTION OF THE PREFERRED EMBODIMENTS

Figure 1:
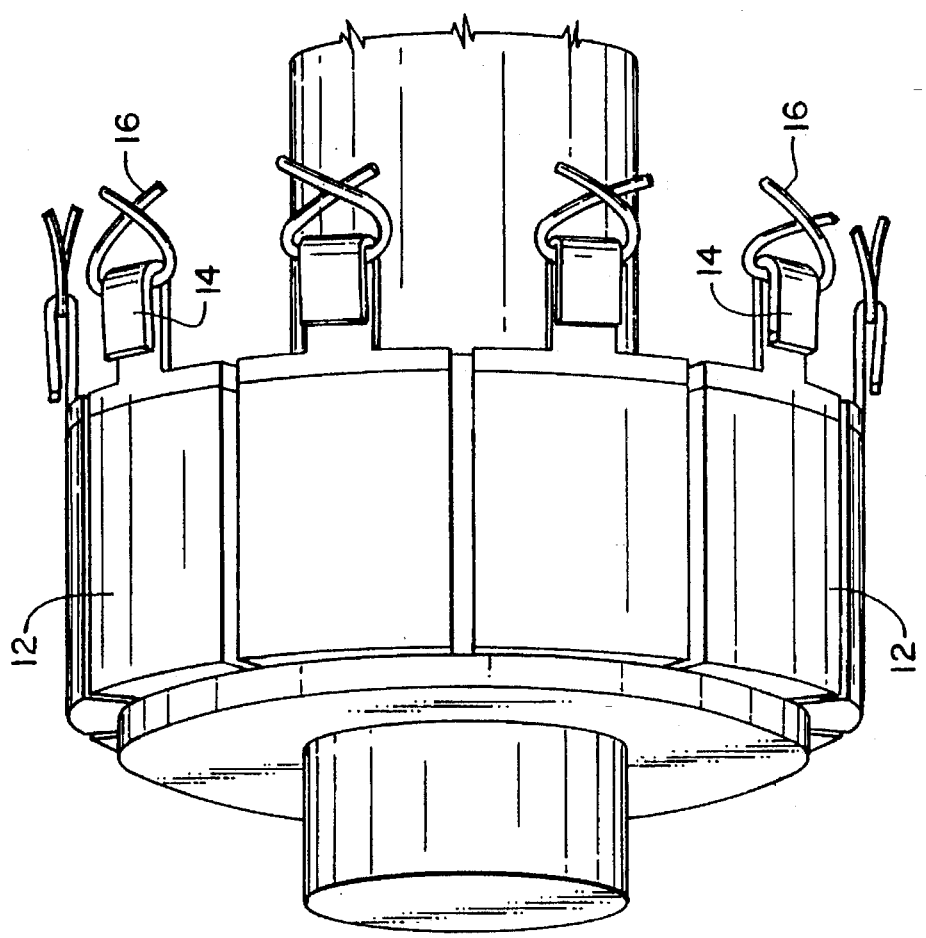
FIG. 1 shows the commutator portion of an armature showing armature wires connected into risers or tines.

The present invention involves a cost effective approach for the use of high performance titanium-containing magnet wire resin insulation and at the same time producing a high quality metallurgical bond between the copper armature wire ends and the commutator. FIG. 1 is a general illustration of the commutator portion of an armature. The commutator segments are identified as 12 and the risers or tines are identified as 14. The armature wire ends 16 are inserted into the hook-shaped tines and the tines are then deformed so as to clamp the wire into the tine. As is conventional, electrodes would be used to pass an electrical current through the wire-to-tine interface to weld or fuse the wire to the tine. Although welding is a commonly used term, the wire ends are actually fused to the tine in a manner similar to resistance welding. Although one general arrangement has been illustrated, this is by way of example only and the invention to be described is applicable to any arrangement or configuration involving the welding or fusing of the end of an armature coil wire to a commutator.

Figure 2:
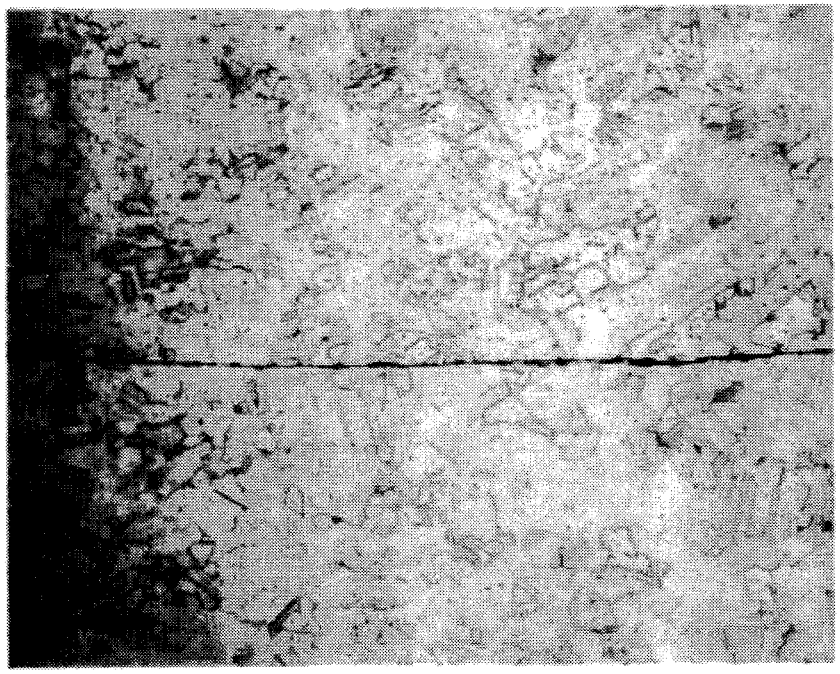
FIG. 2 is an optical micrograph at 200× showing the interface line between the wire-to-tine bond using prior art processes.
Figure 3:
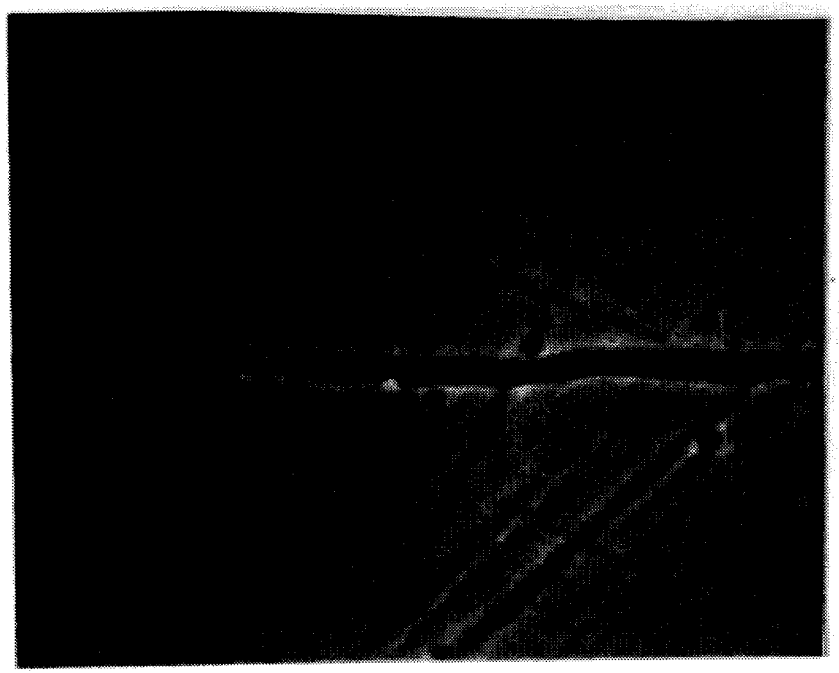
FIG. 3 is back-scattered electron micrograph at 4000× showing the same type of interface using prior art processes.
Figure 4:
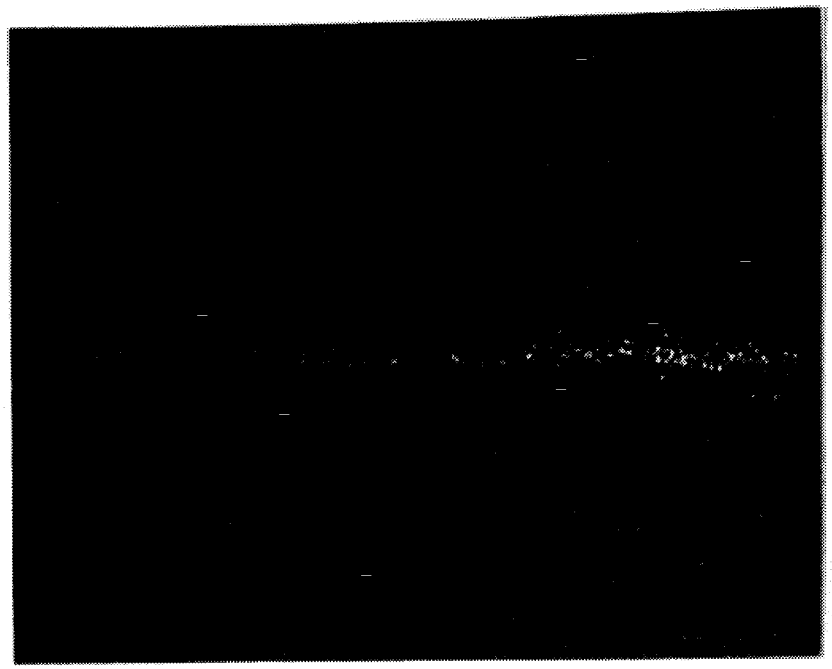
FIG. 4 is a titanium x-ray map showing the residue of titanium oxides along the wire-to-tine interface also using prior art processes.

FIGS. 2, 3 and 4 all illustrate the nature of the interface or bond between the wire and the tine according to the prior art. FIG. 2 is an optical micrograph at 200× which shows the distinct bond line which is indicative of the presence of the titanium oxide layer. FIG. 3 is a back-scattered electron micrograph at 4000× which more graphically illustrates this titanium oxide layer at the bond line. FIG. 4 is an x-ray map of the titanium clearly showing the concentration of titanium atoms along this bond line. In total, these FIGS. 2,3 and 4 illustrate that the bonds formed by prior art processes are not very effective because of the concentrated layer of titanium oxide preventing a true metallurgical bond throughout. What is desired is good metallurgical bonding in major areas around the periphery of the wire-to-tine interface. Complete bonding around the entire periphery would not be required to produce a marked performance improvement.

It has been found according to the present invention that the surface of the tines should be roughened in the area of contact with the wire on a scale comparable to the thickness of the crushed insulation. The roughened surface has pitting or indentations the depth of which is at least equal to the average of the crushed thickness of the insulation coating on the wire. This crushed insulation thickness is normally several (2) microns thick.

Figure 5:
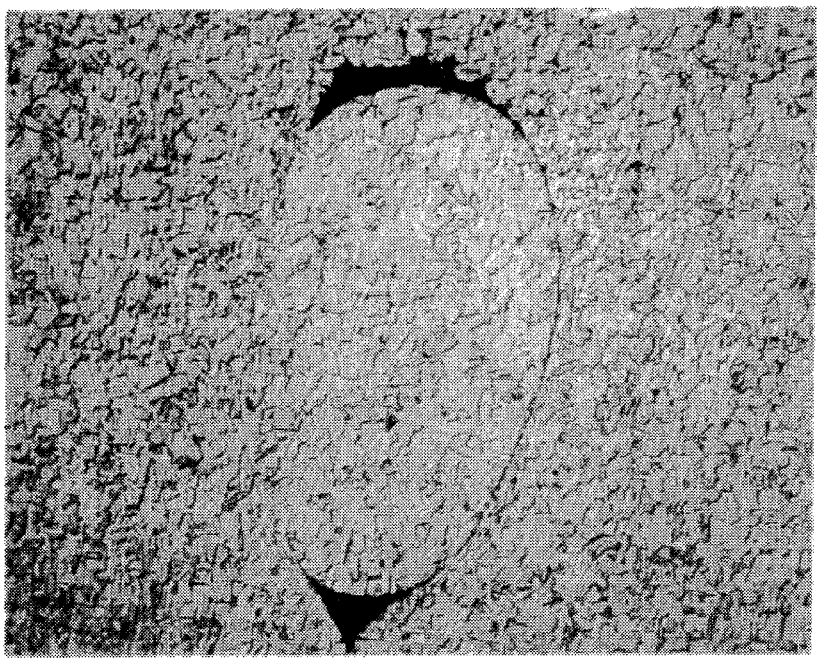
FIG. 5 is an optical micrograph at 100× showing a cross section of the wire fused into a tine using the present invention.
Figure 6:
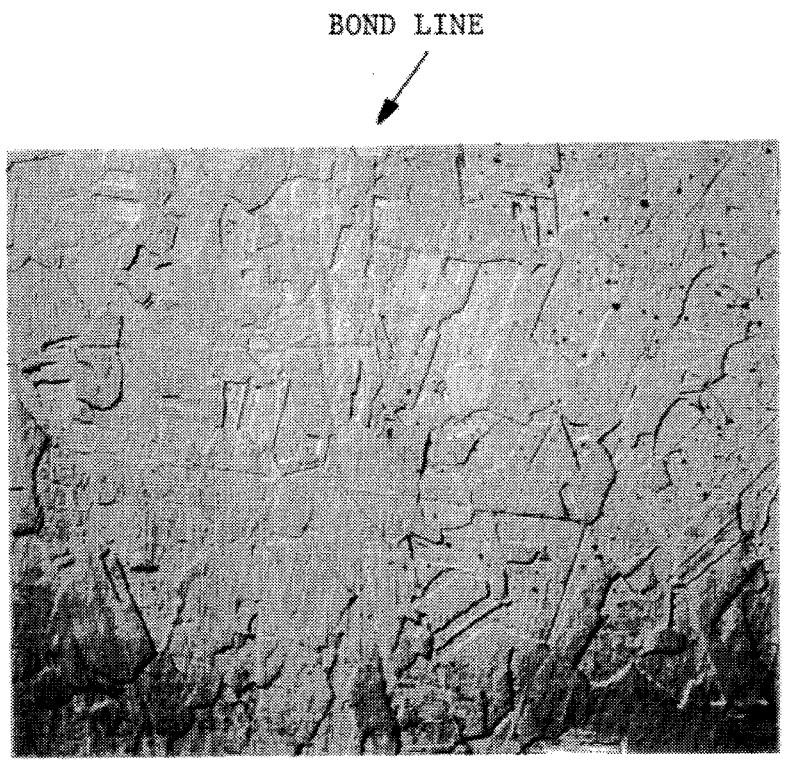
FIG. 6 is a similar optical micrograph but at 500×.
Figure 7:
FIG. 7 is back-scattered electron micrograph using the invention at 4000×.
Figure 8:
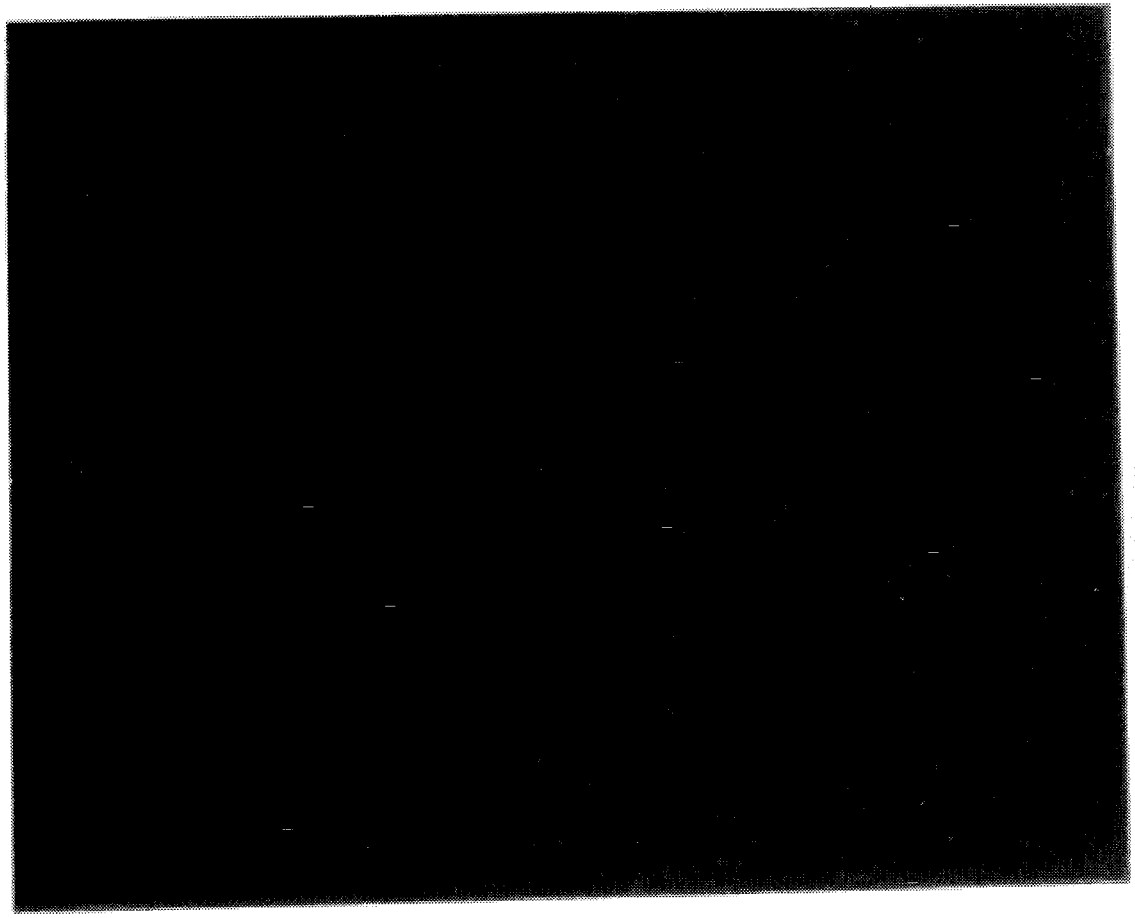
FIG. 8 is a titanium x-ray map showing the residue of titanium oxides along the wire-to-tine interface using the present invention.

Roughening the surface of the tine by grit or vapor blasting with silica glass beads prior to fusing produces extensive areas at the wire-to-tine interface showing good metallurgical bonding. FIG. 5 is an optical micrograph at 100× which shows the entire periphery of the wire inside the tine and illustrates the extensive good bonding. FIG. 6 is an optical micrograph at 500× which, compared to FIG. 2 at 200×, shows much less of a titanium layer along the marked bond line. Likewise, FIG. 7 which is a back-scattered electron micrograph at 4000× shows less of a boundary line than does FIG. 3. FIG. 8 clearly illustrates that the titanium which shows up on the titanium x-ray map is dispersed as isolated particles and shows little or no concentration along a bond line.

The titanium oxide particles which are present in the insulation are disrupted and dispersed by two effects. In the first place, the simple mechanical abrasion resulting from a rough tine surface has the effect a disrupting the insulation layer and thus the titanium oxide particles. Secondarily, the electrical field gradients on the rough tine surface are significant during fusing. These gradients tend to disperse loose titanium oxide particles which are released upon the burning of the insulation during the fusing. The roughened surface also tends to provide flow paths to disperse these particles more uniformly over the surface of the tine and to the ambient atmosphere. With conventional, smooth tines, the electrical gradients would be much less and have less of an effect on the dispersion of the titanium oxide particles.

A variety of techniques can be employed to produce the roughened tine surface of the present invention. For example, shot peening, acid etching, water jet impingement, air blasting or a fine stamped pattern could be used. In the preferred embodiment, vapor blasting with silica glass beads having a particle size of −625 mesh (100% through a 625 mesh screen or about less than 20 microns) is employed. Vapor blasting uses a water suspension of the fine particles which is then propelled at high speed with air or steam.

In securing the wires to the tines, a wire end is inserted into the hook-shaped tine and the tine is then squeezed down onto the wire. An electrode is then brought into contact with the tine and an electrical current is passed through the tine and the tine-to-wire interface. The heat generated is sufficient to fuse the wire and tine together. In the present invention, it has been determined that it is preferable to use an alternating current at a fairly high voltage for the fusing operation because that tends to magnify the electrical field gradients at the tine-to-wire interface which then enhances the dispersion of the titanium oxide. As an example only, a fusing voltage of 300 has been employed but that can be varied depending upon the particular situation.

There is an additional economic benefit to the surface roughening operation of the present invention. It is currently conventional to pre-tin the tines to prevent oxide film formation on critical areas during storage and prior to the actual manufacture of the armature. It is thought that such oxide films interfere with the formation of a good bond between the tine and the wire. By the vapor or grit basting or other roughening procedure of the present invention immediately prior to the fusing operation, the need for a corrosion resistant tin layer is eliminated.

We claim:

1. A method of attaching armature wire ends of electric motors to commutator tines wherein said armature wires have a titanium oxide-containing insulation coating of a selected thickness comprising the steps of:

a) roughening the surface of said tines to a depth of at least about the thickness of said insulation coating;

b) placing armature wire ends in contact with said roughened tine surfaces; and c) fusing said armature wire ends to said tines.

2. A method as recited in claim 1 wherein said surface is roughened to a depth of about 2 microns.

3. A method as recited in claim 1 wherein said step of roughening comprises a process selected from the group consisting of grit blasting, fluid blasting and etching.

4. A method as recited in claim 1 wherein said step of roughening comprises the step of vapor blasting with silica beads.

5. A method as recited in claim 4 wherein said silica beads have a particle size of −625 mesh.

6. A method as recited in claim 5 wherein said surface is roughened to a depth of about 2 microns.

7. A method as recited in claim 1 wherein said tine is squeezed around said wire prior to fusing.

8. A method as recited in claim 1 wherein said step of roughening comprises the step of stamping a rough pattern onto said tines.

* * * * *